United States Patent [19]

Cioca

[11] 4,419,288
[45] Dec. 6, 1983

[54] ELASTIN HYDROLYZATE

[75] Inventor: Gheorghe Cioca, Coatesville, Pa.

[73] Assignee: Seton Company, Newark, N.J.

[21] Appl. No.: 409,316

[22] Filed: Aug. 23, 1982

Related U.S. Application Data

[63] Continuation-in-part of Ser. No. 296,985, Aug. 27, 1981, Pat. No. 4,363,760.

[51] Int. Cl.$^3$ .......................... A23J 1/10; C07G 7/06; C08L 89/04; C08L 89.06
[52] U.S. Cl. ............................... 260/123.7; 424/177; 260/112 R
[58] Field of Search .......................... 260/123.7, 112 R

[56] References Cited

U.S. PATENT DOCUMENTS 4,363,760 12/1982 Cioca .................................. 260/123.7

OTHER PUBLICATIONS

Nature, vol. 200, 1963, pp. 651–652 (Thomas et al.).
Cosmetics & Toiletries vol. 94, Oct. 1979, pp. 23–38, Berg et al.
Biochem. J., (1964), pp. 30C–33C, Partridge et al.
Cardian J. of Biochemistry, vol. 44, (1966), Anwar, pp. 725–734.
J. of Chromatography, vol. 31, (1967), Ledvina et al., pp. 56–61, Analytical Biochemistry, 32, 118–121, (1969), Corbin.

*Primary Examiner*—Howard E. Schain
*Attorney, Agent, or Firm*—Webb, Burden, Robinson & Webb

[57] ABSTRACT

A soluble elastin partial hydrolyzate is comprised of polypeptides having at least 3.5 desmosine and isodesmosine residues/1,000 amino acid residues.

3 Claims, No Drawings

ELASTIN HYDROLYZATE

CROSS-REFERENCE TO RELATED APPLICATIONS

This application is a continuation-in-part of U.S. application Ser. No. 296,985, filed Aug. 27, 1981, now U.S. Pat. No. 4,363,760.

BACKGROUND OF THE INVENTION

1. Field of the Invention

This invention relates to the preparation of elastin hydrolyzates.

2. Description of the Prior Art

Elastin is the major component of elastic fibers found primarily in connective tissue in conjunction with collagen and polysaccharides. Major concentrations of elastin are found in blood vessels. Another source of elastin is in the ligaments, and more particularly, the ligamentum nuchae, prominent in the necks of grazing animals and in their hides. The ligamentum nuchae is a preferred source of elastin because of the high concentration of elastin therein.

Elastin is known to have a highly distinctive amino acid composition. Although similar to collagen in that one-third of the amino acid residues are glycine, elastin is rich in proline, and in contrast to collagen, elastin contains very little hydroxyproline, no hydroxylysine, and is very low in polar amino acids. Elastin is very rich in nonpolar aliphatic residues such as isoleucine, leucine, valine and alanine. Elastin, as present in mature animals, is highly cross-linked, therefore making it very difficult to solubilize. This dense cross-linking is attributable to the desmosine and isodesmosine residues which are highly functional and cross-link both intra- and interfibrillarly. It is believed that the desmosine and isodesmosine cross-linking gives the elastin fibers their elasticity. The desmosine residue can be represented by the structural formula:

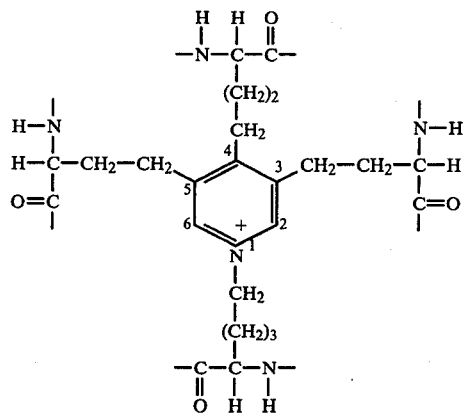

And the isodesmosine residue can be represented by the structural formula:

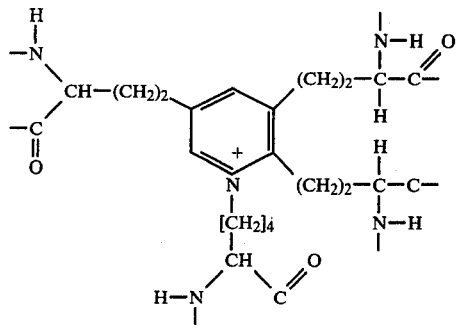

This highly cross-linked structure is extremely difficult to solubilize and purify, especially in the case of mature animals such as horses, cows and the like, which are aged and thus contain elastin which has an extremely high cross-link density.

Prior art methods of solubilizing elastin primarily include the use of elastases to hydrolyze the peptide linkages to provide an acceptable product.

Solubilized elastin has found utility in the cosmetic and pharmaceutical fields. However, its manufacture has been limited to small quantities and it is not necessarily of acceptable purities because of the enzymatic residue required for the hydrolysis.

Further, partially hydrolyzed elastins have been produced; however, the processing conditions for their production reduce the amount of desmosine and isodesmosine amino acid residues which are recovered in the elastin hydrolyzate. Therefor, many of the elastin hydrolyzates lose the primary elastin-characterizing amino acids, i.e. desmosine and isodesmosine. One particular method of producing elastin by nonenzymatic means is disclosed in "ELASTIN" by Berg et al. *Cosmetics & Toiletries*, Vol. 94, October, 1979.

Characteristically, elastin in its natural state in mature animals, and particularly the ligamentum nuchae, is present at a level of at least 3.5 combined desmosine and isodesmosine residues/1,000 amino acid residues. Thus, in order to produce a hydrolyzed elastin which retains the basic characteristics of elastin, it is necessary to recover substantially all of the desmosine and isodesmosine residues which are present in the starting material.

In accordance with the present invention, the method of producing a soluble elastin partial hydrolyzate in pure form is provided wherein the desmosine and isodesmosine residues are substantially recovered.

BRIEF DESCRIPTION OF THE INVENTION

A soluble elastin partial hydrolyzate is comprised of polypeptides having at least 3.5 desmosine and isodesmosine residues/1,000 amino acid residues.

DETAILED DESCRIPTION OF THE INVENTION

The elastin-containing material may be obtained from a variety of sources well known to those skilled in the art. Preferably, the source of elastin is natural insoluble elastin from bovine hide or the bovine ligamentum nuchae. Although the hides themselves may be used as a source of elastin, it is preferred that the bovine ligamentum nuchae be used since it has about 80 percent by weight elastin therein. The elastin in accordance with the invention may be prepared by the process disclosed in U.S. patent application Ser. No. 296,985, filed Aug. 27, 1981 entitled "Partially Hydrolyzed Elastin From Limed Hide Trimmings", incorporated herein by reference and made a part hereof.

When the ligamenta nuchae are used as a source of elastin, just as are the hides, the collagen constituents must be removed therefrom. In order to remove the collagen constituents therefrom, the collagen is solubilized by the use of an acid solution containing citric acid, tartaric acid, weak hydrochloric acid or the like. The acid should be sufficiently weak so that it does not hydrolyze the elastin, but must be sufficiently strong so as to solubilize the collagen. Preferably, the acid should be sufficient to provide a pH to the aqueous solution of 3.5 to 4.5. In addition to the acid hydrolysis of the collagen, organic peroxides may be used in the same solution in order to initiate the destabilization of the desmosine and isodesmosine cross-linkages. The treatment of the ligaments with the aqueous acid solution is for about 12 to 18 hours at room temperature with agitation. Subsequent to the acid treatment, the liquid is drained and the ligaments washed with cold water. The ligaments are then autoclaved at 2.2 to 3 atmospheres pressure for about 2 to 8 hours. After autoclavation, the ligaments are then treated with a base such as sodium hydroxide or potassium hydroxide in order to hydrolyze the elastin cross-linkages, along with sodium sulfate at a level of 1 to 1.5 molar in water to prevent overswelling of the elastin fibers. Sufficient base should be provided to establish a pH of 10 to 12. The ligaments are immersed in the solution for about 12 to 18 hours, removed from the solution, and again washed. The ligaments are then neutralized with dilute acid, preferably a mineral acid such as hydrochloric acid or sulfuric acid. After neutralization, the ligaments are washed with cold water. The ligaments are then placed in an appropriate vessel and shredded in the presence of an acidic solution at a pH of 2.2 to 3.2, and after shredding, the shredded ligaments are boiled in water for 3 to 5 hours. After boiling, no ligament strands should be visible and there is an apparent homogeneous solution. Subsequent to boiling, the solution is allowed to cool and it is filtered. The pH of the solution is adjusted with dilute sodium hydroxide to a pH of about 6. To the solution having the adjusted pH is added 0.1 to 0.2 percent of an organic or inorganic peroxide or a combination thereof, along with a filtering aid such as diatomaceous earth or the like and/or charcoal. The solution is then boiled for 1 to 5 hours and filtered. Additional peroxide treatments may be provided, depending on the extent of cross-linking of the elastin starting material. The pH of the elastin solution is adjusted to about 5 to 6 and the solution is filtered. Stabilizers may be added to prevent degradation of the elastin partial hydrolyzate upon storage.

The peroxides useful in destabilizing the desmosine and isodesmosine bonds are the organic and inorganic peroxides, and most preferably, the inorganic peroxides. Exemplary of inorganic peroxides are hydrogen peroxide and ammonium persulfate. Ammonium persulfate is represented by the structural formula:

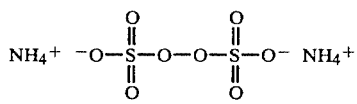

Organic peroxides may be used and are selected on the basis of decomposition half-life in the presence or absence of a suitable accelerator. Typical organic peroxides are tertiary-butyl hydroperoxide, benzoyl peroxide, lauryl peroxide, dicumene hydroperoxide and the like. Combinations of various peroxides may be used in treating the insoluble elastin. Preferably, the peroxide is present at a level of about 0.025 to 0.5 percent by weight based on the weight of the insoluble elastin, and more preferably, about 0.1 to 0.25 percent by weight based on the weight of the insoluble elastin. It has been found that hydrogen peroxide and ammonium persulfate mixed together in approximately equal quantities are useful in treating the insoluble elastin. It is believed that the peroxide destabilizes the desmosine and isodesmosine cross-linkages, which is required to partially hydrolyze and solubilize the elastin. Preferably, the insoluble elastin is treated with the peroxide in the presence of water at above room temperature and for the final hydrolysis under refluxing conditions. When ammonium persulfate and hydrogen peroxide are used in about equal quantities as the peroxide constituents, the elastin is treated in the presence thereof under above ambient temperature conditions and below reflux at 12 to 18 hours and under reflux for 3 to 5 hours, and more preferably, 3 to 4 hours.

Although the peroxide destabilizes the desmosine and isodesmosine cross-linkages, it is necessary to further treat with acid to perform the complete hydrolysis. Most preferably, the acidic solution is composed of water and a mineral acid such as hydrochloric acid, sulfuric acid or the like. However, weaker acids such as acetic acid may also be used but are not preferred. In order to hydrolyze the elastin it is necessary to heat the elastin in the presence of the acid, preferably at reflux and at atmospheric pressure. In the case of a solution of 3 to 10 percent hydrochloric acid, and preferably 5 to 7 precent hydrochloric acid, refluxing treatment is between 2 to 8 hours, and more preferably, 3 to 5 hours.

The substantially pure partially hydrolyzed elastin in accordance with the above procedure has an average molecular weight of 8,000 to 15,000, with a substantial number of hydrolyzate molecules having a molecular weight between 500 and 1,000. Thus, the water soluble partial hydrolyzate has a molecular weight range of 500 to 15,000. It has been found upon analysis that the procedure according to the invention recovers substantially all of the desmosine and isodesmosine amino acid residues from the elastin, thus maintaining elastin-like characteristics to the hydrolyzate. Further, it has been found that the soluble elastin partial hydrolyzate in accordance with the invention has at least 3.5 desmosine and isodesmosine residues/1,000 amino acid residues. In the case where some polypeptides are extracted during the hydrolysis procedure, it has been found that the desmosine and isodesmosine remain so that higher levels than 3.5 residues/1,000 residues and up to 6 residues/1,000 residues are present in the elastin partial hydrolyzate, evidencing the fact that all the desmosine and isodesmosine residues present in the starting material are recovered in the hydrolyzate.

The dissolved partially hydrolyzed elastin may be further purified by treatment with activated carbon or the like. Further, if the solution is hazy it may be further treated with hydrogen peroxide or a similar peroxide to make the solution transparent. Further stabilizers and antioxidants may be added to impart prolonged shelf life to the elastin solution. Typical stabilizers are sorbic acid, sodium benzoate and the like. The hydrolyzate is soluble in water and is pourable as a solution of up to 40 percent by weight at ambient temperature.

If a nonaqueous solution of the partially hydrolyzed elastin is desired, the water may be removed from the elastin solution by evaporation or the like, and it may be redissolved in propylene glycol, dipropylene glycol or the like.

The invention is further illustrated by reference to the following example.

EXAMPLE

In an appropriately sized vessel were charged 100 pounds of fresh beef neck ligaments (ligamentum nuchae). Water at 85° C. was added until the ligaments were fully immersed. One thousand grams of citric acid, 50 grams of ammonium persulfate, and 500 milliliters of 30 percent hydrogen peroxide were charged to the vessel with agitation. The agitation was continued for 18 hours without the addition of heat thereto. The ammonium persulfate and hydrogen peroxide began the attack on the desmosine and isodesmosine cross-linkages while the citric acid solubilized any collagen or other proteinaceous impurities in the ligaments. After agitation for 18 hours, the liquid and fat were drained from the vessel and the ligaments were washed with cold water for approximately 1 hour, or until all the loose fat was removed. The ligaments were placed in an autoclave at 40 p.s.i. (2.8 atmospheres) for about 6 hours. After autoclavation, any excess liquid and fat were drained from the autoclave and the ligaments were washed in cold water for about 1 hour. For each 7.5 pounds of ligaments the following solution was added thereto: 10 liters of water, 2.2 pounds of sodium hydroxide and 3 pounds of sodium sulfate. The pH of the solution was 10 to 12. The ligaments were immersed in this solution and allowed to stand for 18 hours. The solution was drained from the ligaments and the ligaments were washed with cold water for approximately 1 hour. The ligaments were charged to an appropriately sized stainless steel vessel and water was added thereto until fully immersed. Two liters of 37 percent HCl were added to the vessel, agitated until homogeneous, and the ligaments were allowed to stand in the solution at ambient temperature overnight. The pH of the solution was about 7. After standing for 18 hours, the liquid was drained and the ligaments were washed with cold water for about 1 hour.

The washed ligaments were placed in an appropriately sized vessel and water was added thereto until fully immersed. Approximately 2.3 liters of 37 percent HCl were added to the water. The contents of the vessel were agitated with a high-speed rotatable mixer for 2 to 3 hours and the ligaments were fully shredded. The dispersion of shredded ligaments and water was placed in an appropriate vessel and heated at reflux for about 4 hours. After 4 hours, no ligament strands were visible. The solution was cooled to room temperature and filtered. The filtered solution was placed in 5 gallon pails and adjusted to a pH of 6 and 5 normal aqueous sodium hydroxide. To each 5 gallons of solution were added 100 milliliters of 30 percent hydrogen peroxide and 60 grams of ammonium persulfate, along with 50 grams of diatomaceous earth and 75 grams of animal charcoal as a clarifier. The material was then placed in the appropriate vessel and heated for 2 to 3 hours under reflux and allowed to cool. After cooling, the material was filtered through fine filter paper and to each 40 pounds of material were added 80 milliliters of 30 percent hydrogen peroxide and 40 grams of ammonium persulfate. The material was allowed to stand overnight. After standing overnight, the pH was adjusted to 5–5.5 with aqueous ammonium hydroxide and the solution was adjusted to 10 percent solids with water. The material was again filtered through fine filter paper, and to each 40 pounds of material were added 40 grams of sorbic acid, 20 grams of sodium benzoate and 40 grams of Germall 115 antioxidant. The elastin partial hydrolyzate produced in accordance with the Example has the following analysis:

Total nitrogen: 1.5 percent
Elastin partial hydrolyzate: 8.43 percent
Dry matter: 12 percent
Ash: 3 percent
pH: 5 to 5.5

Amino acid analysis of the material showed that there were 3.9 combined desmosine and isodesmosine residues/1,000 residues of amino acid residues.

The average molecular weight of the elastin was about 10,000, having a molecular weight distribution between 500 and 20,000.

Thus, in accordance with the invention, a partial hydrolyzate of elastin which was water soluble was prepared having from 3 to 4 desmosine and isodesmosine residues/1,000 residues and having an average molecular weight of 8,000 to 15,000.

Although the invention has been described with reference to specific materials and specific processes, it is only to be limited so far as is set forth in the accompanying claims.

I claim:

1. A soluble elastin partial hydrolyzate comprised of polypeptides having from 3 to 4 desmosine and isodesmosine residues/1,000 residues.

2. The elastin partial hydrolyzate of claim 1 wherein the polypeptides have a molecular weight range of 500 to 20,000.

3. The elastin partial hydrolyzate of claim 1 having an average molecular weight of 8,000 to 15,000.

* * * * *